United States Patent Office 3,052,553
Patented Sept. 4, 1962

3,052,553
TRANSPARENT FOOD WRAPPER
Richard H. McKillip, East Haven, and Richard Henderson, New Haven, Conn., assignors to Olin Mathieson Chemical Corporation, a corporation of Virginia
No Drawing. Filed July 1, 1959, Ser. No. 824,173
2 Claims. (Cl. 99—171)

The subject invention relates to a transparent wrapping adapted for use in packaging of foods containing oils and fats. More particularly, it relates to a transparent wrapping material capable of inhibiting the oxidative spoilage of food articles containing oil or fats at the surface thereof.

In recent years, there has been an increased use of foods of the "snack" variety. Such foods include potato chips, French fried potato sticks, corn curls, assorted nuts, etc. The fats naturally occurring in these items or imparted to the items in the process of preparation, as by deep fat frying, are susceptible to objectionable flavor and odor changes caused by oxidation, generally termed "rancidity." These objectionable off-flavors and off-odors in products susceptible to oxidative rancidity can be to some degree retarded or eliminated by excluding light, by packaging in an oxygen-free atmosphere or by including in the product substances which retard the development of oxidative rancidity. The cost of using these various packaging techniques and of the materials necessary to their use, vary roughly in proportion to the effectiveness of the antioxidative effects produced.

One object of the subject invention is to provide a very economical method and article for retarding the oxidative spoilage of food products containing ingredients on their surface subject to such change. Another object is to provide a method of retarding oxidative spoilage of foods. A further object is to provide a transparent wrapping material capable of enhancing the shelf-life of articles contained therein which are susceptible to oxidative spoilage due to the formation of oxidative rancidity. Other objects will be in part apparent and in part pointed out in the description which follows.

In one of its broader aspects, the objects of the invention are achieved by incorporating within a surface coating composition a relatively small quantity of an anti-oxidant material, coating this composition onto a flexible, transparent base sheet, and evaporating the solvent or carrying medium from the layer formed by coating. Among the articles which may be formed in practicing the subject method is a transparent, flexible food wrap film having a small percentage of an antioxidant incorporated in a surface coating applied to the surface of said film.

One of the unique findings, which was made in a test of a particular transparent wrapping material having an antioxidant substance incorporated into a surface coating attached to the sheet undergoing tests, was that a degree of protection afforded to the contents of a package of potato chips, wrapped in a sealed envelope formed of the indicated film, extended to the entire contents of the package.

A preferred mode of preparing a film in accordance with the subject method is as follows:

A transparent, flexible base sheet, such as a sheet of regenerated cellulose, polyethylene, polypropylene, or other polymeric base sheet, is prepared for coating with a surface coating of a transparent, flexible material. The coating composition is prepared in lacquer or latex form to contain approximately 1.0% of propyl gallate based on the solids content of the composition. This compound is a purified grade of propyl 3,4,5-trihydroxybenzoate. Propyl gallate may be incorporated directly into latex composition having a water dispersion medium inasmuch as it is soluble in water. It may be incorporated equally-well in a lacquer solvent and may advantageously be introduced into the solvent through the medium of a carrier solvent such as polypropylene glycol Propyl gallate can be responsible for discoloration in the presence of iron and it is accordingly preferable to employ this antioxidant with a sequestering agent such as citric or ascorbic acid where it may come into contact with iron.

The coating composition containing the preferred concentration of propyl gallate is coated onto one of the prepared base sheets, as indicated above, and heated to drive off the solvent or dispersion fluid, and to consolidate the contents of the coating composition into an adherent, transparent, flexible coating.

As an alternative the anti-oxidant may be introduced into the film as one ingredient of the softener composition. When used in this way much larger quantities of the antioxidant may be employed. The high cost of the antioxidant materials makes a maximum utilization of minimum of the antioxidant an advantage. However, limited amount of the material less than about 3% can be included in the coating without seriously impairing the properties of the film. Where additional antioxidant is desired, it can be added to the softened regenerated base sheet itself.

When present in the softener, it is preferable that at least a portion of the softener be a material such as propylene glycol. There are a number of advantages to the use of such a softener. A first is that the propylene glycol is a good solvent for the antioxidants, such as propyl gallate, and is accordingly effective in introducing the antioxidant into the cellulosic base sheet. A second that it can assist in making the antioxidant available from the film. This is because propylene glycol has relatively high volatility rate as compared to glycerol for example. In emerging from the base sheet the softener such as propylene glycol is effective in moving the antioxidant to the surface of the film where it may contact oil or fatty material.

According to one embodiment of this invention a one side-coated film is prepared. It may be prepared, for example, in accordance with the method taught in copending application for patent Serial Number 757,93 filed August 29, 1958. Preferably, this coating should be one which is particularly resistant to penetration by oil or fat such as the coating formed in accordance with the co-pending application for patent Serial Number 757,936, filed August 29, 1958.

In accordance with this same embodiment the uncoated surface of the film is treated with a composition containing anti-oxidant to impart the antioxidant to the base sheet. One such treatment is the printing of the uncoated surface of the base sheet with a thin layer of an anti-oxidant composition or preferably of a softer material containing an antioxidant material. Offset printing or other means for evenly dispersing the material over the surface of the base sheet may be employed. Spray, or dip coating followed by doctoring may also be employed for example.

When a one-side coated film is prepared in accordance with the method described in the co-pending application Serial Number 757,937 by placing two sheets of regenerated cellulose in contact and passing them continuously through a self-anchored coating process to coat one side only of each sheet, it then becomes convenient feasible, by reversing the sheets so that the two uncoated sides are on the outside, to pass these sheets continuously through a bath containing an anti-oxidant, and there to coat the composition onto both surfaces. Two treated sheets are produced by this operation.

It is also within the scope of the subject invention corporate antioxidant into the surface coating and to resist the removal of this antioxidant through and to the surface of the film by including an overage of a volatile softener in the base sheet. A softener such as propylene glycol can be incorporated in the base sheet in contact with the surface coating for this purpose. This overage is a larger than normal percentage of softener, a portion, or all of which, may be of the more volatile type.

Where an antioxidant is included in the base sheet rather than solely in the coating, a wider selection of antioxidants which may be used effectively becomes possible. One which may be used, and which is unusually effective, is a composition available under the trade name Tenox–6 : has the following composition: 10% butylated hydroxanisole (a mixture of 2-tertiary butyl 4-hydroxyanisole and 3-tertiary butyl 4-hydroxy anisole); 10% butylated hydroxytoluene 2,6-di-tertiary butyl 4-methyl phenol, 6% propyl gallate (3,4,5-trihydroxybenzoate; 6% citric acid, 56% mixed glycerides; and 12% propylene glycol).

Numerous alternative compositions, compatible with the regenerated cellulose or similar base sheet and the softeners used therein, may be selected and used for this purpose.

Where a composition such as that above is to be included in a regenerated cellulose base sheet preparatory to forming anchored surface coatings on the sheet, it is highly preferable that the sheet be subsequently coated with self-anchored coatings rather than with base-sheet-anchored coatings. One reason is that the use of self-anchored coatings considerably simplifies the coating process and makes it more economical.

The simplification results because it is possible to include the antioxidant material directly in a softener bath such as is usually employed in adding the softener to the base sheet. This direct addition can be made when using self-anchoring coatings because there are no resinous ingredients in the bath which have the function of inducing anchorage of the coating to the base sheet and which may react with the antioxidant additives. Such resinous anchorage inducing agents are usually present in softener baths used in connection with the formation of base sheet anchored film and are highly reactive and unstable particularly with regard to acid additives. The economy results because the number of steps, and the amount of apparatus, used in carrying out the formation of the film are minimized.

Where a surface coating is employed, the temperature at which the coating formation treatment is carried out must be below 295° F. when propyl gallate additive is used because at this temperature and above, the propyl gallate is unstable.

Following are examples of the methods of carrying out the subject invention. It will be understood that these examples are given for illustrative purposes only and they are not to be understood as limiting or defining the scope of the invention.

EXAMPLE

A web of softened regenerated cellulose base sheet about 4.5 inches wide and one mil thick was fed continuously from a roll at a speed of about 65 feet per minute over guide rolls and into an immersion coating pan. The pan contained a nitrocellulose lacquer coating having approximately the following composition.

| Component: | Weight percent |
|---|---|
| Nitrocellulose | 40 to 60 |
| Plasticizer | 30 to 40 |
| Blending resin | 3 to 15 |
| Wax | 1 to 5 |
| Polymeric plasticizer | 5 to 15 |

The lacquer contained about 15% solids and about 1% each of the citric acid and propyl gallate based on the solids content of the lacquer.

The web is passed around a roll mounted below the surface of the lacquer in the coating pan to become coated on both sides as it emerges from the pan. It then passes through doctor blades to remove excess lacquer from the web.

This was followed by the heating of the sheet in a solvent evaporation tower, and the quenching and tensioning of the sheet as it passed from the drying tower. The coated sheet containing the antioxidant was then formed into rolls.

As a comparative test of the products formed by these methods, a roll of the product thus prepared was employed in forming the inner bag of a double wall cellophane package for potato chips on conventional, automatic bag-making and packaging machinery. The outer cellophane layer of the double wall package was substantially the same as that of the cellophane containing the antioxidant, except that no antioxidant was present in the outer film. Approximately 150 bags were formed with the antioxidant containing film as the inner ply, and approximately 150 bags were formed to contain no antioxidant. All 300 of these bags were filled with potato chips at about the same time and under the same conditions. Forty bags of each film were stored at 104° F. and 4% relative humidity. Eight bags of each type were held at ambient conditions.

A five member taste panel, comprised of persons with an established sensitivity to rancidity and staleness in potato chips, evaluated the properties of the test and control chips at intervals throughout the test period. In testing, each of the panelists, while alone, was given two bags coded so that the type of film used as the inner bag was an unknown. Each of the bags was opened by a panelist and rated for odor and then for taste. The rating system used was as follows. For odor: fresh oil was rated 5 to 6; slightly rancid oil was rated 3 to 4; and rancid oil was rated 1 to 2. For taste: excellent taste was rated 9 to 10; fresh taste 7 to 8, stale taste 5 to 6; stale slightly rancid was rated 3 to 4; stale and rancid was rated 1 to 2. The evaluation of the five scores for odor and for taste were compiled for each test period and are given below in Table I.

*Table I*

AVERAGE TASTE PANEL RATINGS OF POTATO CHIPS WITH ANTIOXIDANT SURFACE LAYER ON INNER FILM IN DOUBLE WALL BAGS

| Test Interval | Average of 5 ratings | | | |
|---|---|---|---|---|
| | Taste | | Odor | |
| | Antioxidant | None | Antioxidant | None |
| Ambient Storage (75–85° F.): | | | | |
| 1 day | 9.6 | 9.6 | 5.8 | 5.8 |
| 3 days | 7.3 | 7.5 | 5.5 | 5.0 |
| 6 days | 6.6 | 6.4 | 4.6 | 4.4 |
| 8 days | 6.0 | 6.2 | 4.4 | 4.2 |
| 14 days | 6.3 | 5.0 | 4.8 | 3.8 |
| 16 days | 5.3 | 3.8 | 3.5 | 3.3 |
| 21 days | 5.4 | 4.4 | 3.8 | 3.0 |
| 24 days | 4.8 | 3.8 | 3.8 | 2.8 |
| 104° F./4% R.H. Storage: | | | | |
| 1 day | 8.0 | 8.0 | 5.0 | 5.0 |
| 2 days | 7.8 | 7.2 | 5.0 | 5.0 |
| 5 days | 6.8 | 6.8 | 4.8 | 4.6 |
| 7 days | 6.5 | 5.6 | 4.3 | 3.8 |
| 9 days | 5.7 | 4.3 | 4.3 | 4.0 |
| 12 days | 6.5 | 5.0 | 5.0 | 3.5 |
| 15 days | 4.2 | 4.8 | 3.6 | 3.4 |

As is evident from the table, the chips packaged in the antioxidant containing film were generally rated equal to or slightly better than those in the similar film which contained no antioxidant during the first 6 or 7 days of storage. The higher scores found for the contents of the packages containing the antioxidant became more pronounced after the eighth day of storage and through the 24th day of storage. These results evidence the very unusual result that, although the antioxidant is disposed within a thin surface layer on a wrapping material to a very small degree, it is nevertheless effective in effecting large-scale changes, particularly in the taste of articles having a surface coating of oil subject to oxidative rancidity, even though it is remote from this area where protection is afforded. As is evident from the materials stored at the elevated temperature, similar improved storage was achieved with regard to the inhibition of oxidative rancidity.

A further test of the antioxidation enhancing properties of the film, prepared as described above, was made. In this test a sample of the film prepared as described in the example was surface coated with an oil capable of developing oxidative rancidity. A similar coating of oil was placed on a sample of film which had been prepared in a similar manner, but which contained no antioxidant, i.e., a control cellophane film. After a period of storage, the following results were observed:

Table II

|  | Rancidity of Oil on Control Cellophane | Rancidity of Oil on Cellophane Containing 1% Propyl Gallate and 1% Citric Acid |
| --- | --- | --- |
| Period test in days | 15 | 54 |

A second test of this property was made, i.e., the capability of a film containing antioxidant in the coating, to delay the development of rancidity in a layer of oil applied to the surface thereof. In this case a film was prepared containing 1% propyl gallate, 1% citric acid and 1% butylated hydroxytoluene based on the solids weight content of the lacquer from which the coating was formed. The properties of the film having these additional ingredients in the coating were found to be substantially equivalent and entirely satisfactory as a wrap for food products containing oil. However, the film containing the antioxidant in the surface coating, protected an oil layer spread on its surface for 118 days beyond the time when a similar oil film, spread on the film free of the antioxidant, became rancid.

From the foregoing, it is apparent that a novel and useful result is obtained by the incorporation of a very minor quantity of an antioxidant into the surface coating of a transparent, flexible film employed in packaging food articles with oil, subject to being rendered rancid on oxidation. As has been demonstrated, the antioxidant, although embedded in the film coating to only a minor degree, is effective in inhibiting the oxidation of the oil. What is further evident, and what was further unexpected, is that the contents of a package, although remote from the antioxidant containing coating, are also benefited with respect to the extent of oxidative rancidity which occurs on storage, as this is determined by changes in odor and taste of the contents of the package.

The mode of practicing this invention in which the antioxidant materials are included in the surface coating or in the regenerated cellulose base sheet is pertinent to the improvement of transparent flexible bags such as are currently used in packaging potato chips, assorted nuts and the like. These bags are usually double walled in order to afford extra protection to the contents against water vapor transmission and bag breakage. One highly important improvement made possible by this invention is the use of a single wall bag or package having oxidative rancidity retarding properties. In this mode of practicing the invention the coating is formed on a plastic base sheet such as a base sheet of polyethylene, polypropylene, or other polyolefin or polymeric base. The polymeric bas itself provides sufficient strength so that the use of tw layers is unnecessary. In addition the coating improve the resistance to the passage of oils or water vapor to th extent that no additional protection in this regard is r quired. A polymeric film such as that prepared pursua to the copending application for patent Serial No. 483,17 filed January 20, 1955, now abandoned, or the pendi continuation-in-part of this application Serial No. 794,25 filed March 19, 1959, may be used for this purpose.

Polymer coated regenerated cellulose films have al been prepared by incorporating the preferred low volat ity antioxidant compositions in aqueous dispersion co positions such as those disclosed in application Serial N 796,748, filed March 3, 1959. These coatings contain the antioxidant ingredients to the extent of about 1% the solid, i.e., 1% propyl gallate and 1% butylated h droxytoulene in addition to 1% citric acid. The physic properties of this film were not changed substantially as all respects except that of inhibiting oxidative rancidi Propylene glycol was used effectively in solubilizing t antioxidants to facilitate their introduction into the po mer dispersion composition from which the polymer co ing is formed.

The improved containers for foods having a polyme base sheet and a surface coating containing an antioxid are highly effective in retarding the development of oxi tive rancidity and, in addition, are economical in the use materials. They are highly effective for containing s foods as potato chips, assorted nuts and the like. In ac tion they are effective containers for the oil or fats the selves thus they are effective when used for butter, l cheese and other oil or fatty foods.

Since many examples of the foregoing procedures articles may be carried out and made, and since m modifications can be made in the procedures and arti described without departing from the scope of the sub invention, the foregoing is to be interpreted as illustra only, and not as defining or limiting the scope of the vention.

We claim:
1. A transparent flexible wrapper for food substa containing oils and fats, consisting essentially of a tr parent cellophane base sheet and a transparent polym surface layer secured to said cellophane, said surface l containing about 1% to 3% of its weight of a synerg antioxidant consisting of substantially equal parts of pyl gallate, butylated hydroxytoluene and citric acid, layer being effective to inhibit rancidity of said substa
2. A transparent flexible wrapper for food substa containing oils and fats, consisting essentially of a t parent cellophane base sheet and a transparent su layer of nitrocellulose film secured to said celloph said surface layer containing about 1% of its weight of propyl gallate, of butylated hydroxytoluene, an citric acid, said layer being effective to inhibit ranc of said substances.

References Cited in the file of this patent
UNITED STATES PATENTS

| 2,000,251 | Rankin | May 7, |
| 2,038,752 | Musher | Apr. 28, |
| 2,233,172 | Loane | Feb. 25, |
| 2,397,976 | O'Leary | Apr. 9, |
| 2,709,657 | Campbell et al. | May 31, |
| 2,758,032 | Pullman et al. | Aug. 7, |
| 2,835,595 | Salatiello | May 20, |
| 2,843,497 | Stuckey et al. | July 15, |
| 2,905,561 | Barnett et al. | Sept. 22, |
| 2,906,646 | Smith et al. | Sept. 29, |
| 2,991,193 | Fessler et al. | July 4, |